United States Patent [19]

Koizumi et al.

[11] Patent Number: 4,551,775
[45] Date of Patent: Nov. 5, 1985

[54] TAPE RECORDER WITH TWO RECORDING/PLAYING MECHANISMS

[75] Inventors: Satoru Koizumi; Hiroshi Furuhara; Daisuke Teshima, all of Higashihiroshima, Japan

[73] Assignee: Sharp Kabushiki Kaisha, Osaka, Japan

[21] Appl. No.: 334,361

[22] Filed: Dec. 24, 1981

[30] Foreign Application Priority Data

Dec. 24, 1980 [JP] Japan ................ 55-188029
Dec. 24, 1980 [JP] Japan ................ 55-188030

[51] Int. Cl.$^4$ .................. G11B 15/48; G11B 15/00
[52] U.S. Cl. ............................. 360/74.1; 360/93; 360/137
[58] Field of Search ................. 360/90–93, 360/74.1, 137, 69–71, 137, 92; 242/197–200, 180–181; 364/44

[56] References Cited

U.S. PATENT DOCUMENTS

| | | | |
|---|---|---|---|
| 3,860,963 | 1/1975 | Ueda | 360/92 |
| 3,898,692 | 8/1975 | Teruuchi et al. | 360/92 X |
| 3,911,488 | 10/1975 | Wood et al. | 360/91 X |
| 4,031,556 | 6/1977 | Ban et al. | 360/96.4 |
| 4,309,729 | 1/1982 | Kice | 360/74.2 |
| 4,404,610 | 9/1983 | Koizumi et al. | 360/137 |

*Primary Examiner*—Aristotelis M. Psitos
*Attorney, Agent, or Firm*—Birch, Stewart, Kolasch & Birch

[57] ABSTRACT

There is provided a tape recorder which includes first and second recording/playing mechanisms for driving a tape at a constant speed for recording or playing, an auto-stop assembly for discontinuing operation of the first or second recording/playing mechanism when an end of the tape approaches, a control assembly for placing the first or second recording/playing assemblies selectively into a first stop mode or a second stop mode, the first stop mode being the mode from which the first or second recording/playing mechanisms may be switched into a constant driving mode independently of each other and the second stop mode being the mode from which the constant driving mode may be switched from the first recording/playing mechanism to the second or vice verse, and a link assembly connected between the auto-stop assembly and the control assembly for rendering the control assembly operable to shift the constant driving mode from the first recording/playing mechanism to the second or vice verse upon the completion of the constant driving mode in the second or first recording/playing mechanism.

7 Claims, 6 Drawing Figures

TAPE RECORDER WITH TWO RECORDING/PLAYING MECHANISMS

BACKGROUND OF THE INVENTION

1. Field of Art

This invention relates to a tape recorder having two recording/playing mechanisms.

2. Prior Art

It is well known that a tape recorder may include two recording/playing mechanisms for tape dubbing, duplicating, editing or the like. Where two recording/playing mechanisms are to operate in succession in the conventional tape recorder, either of the two recording/playing mechanisms should be first placed into a state ready to start a record mode or play mode through the utilization of a conventional pause mechanism and the remaining one is then placed into a record mode or play mode. When a tape approaches its end in the remaining mechanism, the first mechanism is set free of the pause mode and automatically shifted into record mode or play mode. However, this prior art demands actuation of a record button, a play button, a pause button or the like in a predetermined relation and installation of the individual and complex pause assembly in order to make the first assembly ready to start record mode or play mode. Furthermore, continued recording from the first to the second recording/playing mechanism requires two individual recording circuits.

OBJECTS AND SUMMARY OF THE INVENTION

Accordingly, it is an object of the present invention to provide a tape recorder which avoids the prior art problems.

It is another object of the present invention to provide a tape recorder in which play mode or record mode can be executed in a continuous manner through the use of existing components in the conventional tape recorder.

According to the present invention, when two recording/playing mechanisms are continuously in constant-driving mode (record mode or play mode), the first mechanism may be shifted into constant speed driving mode automatically upon the completion of constant speed driving mode in the second mechanism merely by setting the two recording/playing mechanisms into constant speed driving mode. This procedure does not require that the remaining mechanism be placed into pause mode with the pause assembly and offers advantaged convenience for the listener. This switching relies upon a power-assisted drive scheme using the motor for use in driving the tape. Therefore, this scheme simplifies mechanical structure without fear of errorneous operation to the listener.

Moreover, in driving the two recording/playing mechanisms in a continuous manner at the constant speed, the two mechanisms may be placed into stop mode whereupon the two mechanisms may be switched into constant driving mode independently of each other upon the completion of the continued execution of constant-driving mode from the first to the second recording/playing mechanism.

In a preferred aspect of the present invention, there is provided a tape recorder which comprises first and second recording/playing mechanisms for driving a tape at a constant speed for recording or playing, an autostop assembly for discontinuing operation of said first or second recording/playing mechanism when an end of the tape approaches, a control assembly for placing said first or second recording/playing assemblies selectively into a first stop mode or a second stop mode, said first stop mode being the mode from which said first or second recording/playing mechanisms may be switched into a constant driving mode independently of each other and said second stop mode being the mode from which the constant driving mode may be switched from said first recording/playing mechanism to said second or vice versa, and a link assembly connected between said auto-stop assembly and said control assembly for rendering said control assembly operable to shift the constant driving mode from said first recording/playing mechanism to said second or vice verse upon the completion of the constant driving mode in said second or first recording/playing mechanism.

Preferably, said first and second recording/playing mechanisms each includes a driving motor for execution of the constant driving mode and each of the driving motors is adapted to assist the control assembly bring the associated recording/playing mechanism into a desired one of operating modes. When said first recording/playing mechanism is about to complete the constant driving mode as the end of the tape approaches, the motor for said second recording/driving mechanism is enabled in response to said auto-stop assembly responsive to the completion of the constant driving mode in said first recording/playing mechanism. Consequently, the constant driving mode is taken over from said first recording/playing mechanism automatically.

In another preferred aspect of the present invention, there is provided means for placing both said first and second recording/playing mechanisms into said first stop mode upon the completion of said continued execution of the constant driving mode from said first recording/playing mechanism to said second or vice verse.

BRIEF DESCRIPTION OF THE DRAWINGS

For a more complete understanding of the present invention and for further objects and advantages therof, reference is now made to the following description taken in conjunction with the accompanying drawings showing a tape recorder according to a preferred embodiment of the present invention, in which.

DETAILED DESCRIPTION OF THE INVENTION

Figure 1:
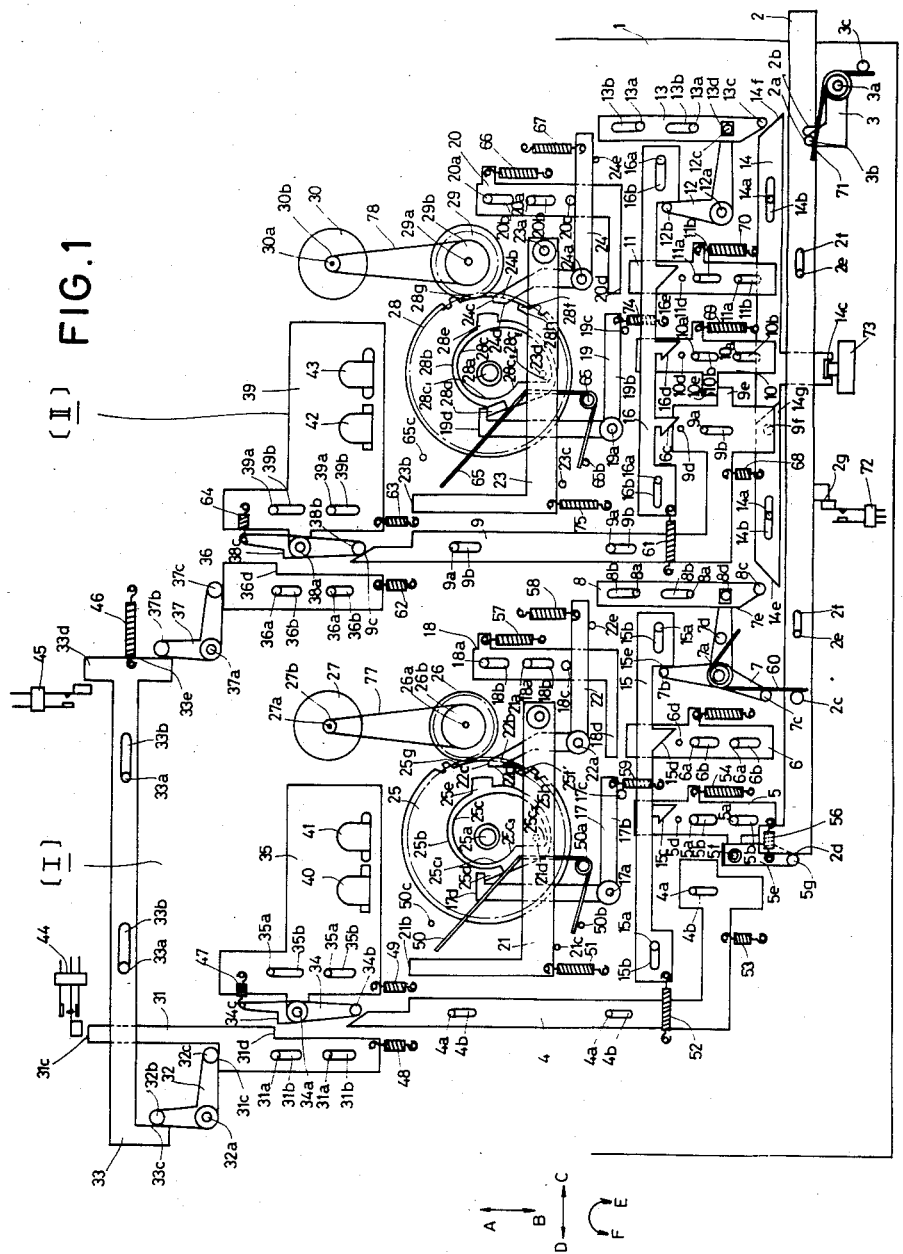
FIGS. 1 and 4 are plan views for explaining different stop modes of a tape recorder according to the present invention.

Referring to the accompanying drawings, there is illustrated a tape recorder in different operational modes according to the present invention. FIG. 1 shows a stop mode. As is clear from those drawings, the tape recorder embodying the present invention includes two recording/playing mechanisms (I) and (II). A main chassis 1 is common to both the recording/playing mechanisms. An actuator lever 2 is mounted thereon to be slidable in the directions of the arrows C and D by inserting its guide opening 2f about a guide shaft 2e standing on the main chassis 1. A positioning lever 3 is pivoted about a shaft 3a on the main chassis 1 in the neighborhood of the switch lever 2. By engaging a hook 3b at a free end of the positioning lever 3 selectively with either of notches 2a and 2b in the lever 2 together with sliding movement of the switch lever 2, the positioning lever 3 holds the lever 2 in either a first position or second position, the first position being where a switch 72 as described below is in an ON position and the second position being where the switch 72 is in an OFF position. This function is backed up by the force of a spring 3c wound about the pivot of the lever 3 and having one end abutting on a pin 3d on the main chassis 1 and the other end engaging with the hook 3b.

The first recording/playing mechanism (I) has a record lever 4, a play lever 5 and a stop lever 6 each of which is slidable in the directions of the arrows A and B between its non-operating position and its operating position by inserting its guide hole 4b, 5b or 6b about each of guide shafts 4a, 5a and 6a on the main chassis 1. Each of these levers is constantly biased to the non-operating position by the action of a spring 53, 54 or 55 extending between the respective one of the levers and the main chassis 1.

The record lever 4 has at its forward end a hook 4d engageable with a record sensing lever 5e and at its backward end a bearing surface 4c engageable with a record switch sensing lever 34. The play lever 5 carries a lock pin 5d which is to be locked in a lock portion 15c of a first lock plate 15 and an unlock pin 6d which is to abut on an unlock portion 15d of the first lock plate 15.

Furthermore, the play lever 5 holds the record sensing lever 5e pivoted about a shaft 5f. The lever 5e is given the force of rotation in the direction of the arrow F by a spring 56 extending between the play lever 5 and the lever 5e, so that a hump 5g at the tip of the lever is forced into contact with a bearing surface 2d of the switch lever 2. When the switch lever 2 is in the first position, the lever 5e abuts on the hook 4d on the record lever 4 in response to depression of the play lever 5, shifting the lever 4 toward the operating position. On the other hand, when the switch lever 2 is in the second position, the record lever 4 is not in engaging relation regardless of the play lever 5 being in a depressed position.

The second recording/playing mechanism (II) similarly includes a record lever 9, a play lever 10 and a stop lever 11 each of which is slidable in the directions of the arrows A and B between its non-operating position and its operating position by inserting its guide hole 9b, 10b or 11b about each of guide shafts 9a, 10a and 11a on the main chassis 1. Each of these levers is constantly biased to the non-operating position by the action of a spring 68, 69 or 70 extending between the respective one of the levers and the main chassis 1.

The record lever 9 and the play lever 10 each carries a lock pin 9d or 10d which is to be locked in a lock portion 16c or 16d of a second lock plate 16 and the stop lever 11 carries an unlock pin 11c which is to abut on an unlock portion 16e of the second lock plate 16.

Furthermore, the record lever 9 has at its forward end a joint pin 9f which may be jointed with a third working surface 14g of a shift lever 14 described below and at its backward end a bearing surface 9c engageable with the record switch sensing lever 38 and further at its central portion a projection 9e engageable with the equivalent 10e at the central portion of the play lever 10.

The first and second lock plates 15 and 16 each is slidable in the directions of the arrows C and D between its non-operating position and its operating position by inserting its guide hole 15b or 16b about each of guide shafts 15a and 16a on the main chassis 1. Each of these levers is constantly biased to the non-operating position by the action of a spring 52 or 61 extending between the respective one of the levers and the main chassis 1.

Although not shown, the play lever 5 and the stop lever 6 for the first recording/playing assembly (I) and the record lever 9, the play lever 10 and the stop lever 11 for the second recording/playing mechanism (II) are respectively provided with buttons. It is to be understod that the record lever 4 for the mechanism (II) is not provided with a button.

Full-auto levers 8 and 13 of a similar configuration each is slidable in the directions of the arrows A and B between its non-operating position and its operating position by inserting its guide hole 8b or 13b about each of guide shafts 8a and 13a on the main chassis 1. The full-auto levers 8 and 13 each has at its forward end a first or second working surface 14e or 14f of the shift lever 14. The remaining ends of the respective levers 8 and 13 are linked to auto-stop assemblies not shown and, when being moved in the direction of the arrow B through operation of the auto-stop assemblies, urge the joint pins 8c and 13c against the first and second working surfaces 14e and 14f, thus moving the shift lever 14 in the directions of the arrows C and D.

Of those full-auto levers, the lever 8 for the first recording/playing mechanism (I) engages with a stop pin 7e on one leg of a "Y" shaped unlock lever 7 pivoted as 7a on the main chassis 1 by its slot 8d. Movement of the full-auto lever 8 is transmitted to the first lock plate 15 by way of a stop pin 7b on the remaining leg of the lever 7. With such an arrangement, when the full-auto lever 8 slides in the direction of the arrow B upon movement of the auto-stop assembly, the first lock plate 15 moves in the direction of the arrow C for unlocking operation.

The unlock lever 7 is given the force of rotation in the direction of the arrow F by a spring 60 whose opposite ends abut on pins 7b and 7c and especially its end abutting on the pin 7c contacts the pin 2c on the switch lever 2.

The lever 13 for the second recording/playing mechanism (II) engages with a stop pin 12c on one leg of an "L" shaped unlock lever 12 pivoted as 12a on the main chassis 1 by its slot 13d. Movement of the full-auto lever 13 is transmitted to the second lock plate 16 by way of a stop pin 12b on the remaining leg of the lever 12. Therefore, when the full-auto lever 13 slides in the direction of the arrow B upon movement of the auto-stop assembly, the second lock plate 16 moves in the direction of the arrow C for execution of unlocking operation.

The shift lever 14 is slidable in the directions of the arrows C and D by inserting its guide hole 14b about a guide shaft 14a on the main chassis 1. In particular, it is slidable in the directions of the arrows C and D under engaging relation between first, second and third bearing surfaces 14e, 14f and 14g of the shift lever 14 and the joint pins 8c, 13c and 9f of the full-auto levers 8 and 13 and the record lever 9.

"L"-shaped trigger arms 17 and 19 are pivoted about support shafts 17a and 19a on the main chassis 1 with its horizontal contact section 17b and 19b being movable to or from the rear ends of the play levers 5 and 10 and the remaining ends having projections 17$d$ and 19$d$. These trigger arms 17 and 19 are biased in the direction of the arrow E under the infuence of springs 59 and 74 lying on the main chassis 1, with the range of its rotating movement being limited by pins 17$c$ and 19$c$ on the main chassis 1. Upon actuation of the play levers 5 and 10 the contact sections 17$b$ and 19$b$ are depressed and the trigger arms are rotated in the direction of the arrow F against the springs 59 and 74 by a given angle.

Actuator rods 18 and 20 are engageable with the backward ends of the stop levers 6 and 11 and slidable in the directions of the arrows A and B by inserting its guide holes 18$b$ and 20$a$ resting on the main chassis 1. These actuator arms 18 and 20 are biased in the direction of the arrow B under the influence of springs 57 and 66 lying on the main chassis 1. The horizontal contact sections 18$d$ and 20$d$ of the actuator arms 18 and 20 are engageable and removable from the backward ends of the stop levers 6 and 11 and slide in the direction of the arrow A against the springs 57 and 66 when the stop lever slides in the direction of the arrow A. Furthermore, the actuator rods 18 and 20 are adapted to slide in the direction of the arrow A against the springs 57 and 66 in response to the auto-stop assemblies.

Subchassis-actuating arms 21 and 23 are of an "L" shaped configuration rotatable about support shafts 21$a$ and 23$a$ on the main chassis 1 and having on the bottom surface of horizontal segments sliding projections 21$d$ and 23$d$. The rear end of a vertical segment of the actuating arms 21 and 23 serve as contact surfaces 21$b$ and 23$b$ movable with respect to subchassises 35 and 39 to be described below. Springs 51 and 75 lying on the main chassis 1 urge these arms in the direction of the arrow F, with the range of rotation thereof being limited by pins 21$c$ and 23$c$ lying on the main chassis 1.

"L"-shaped arms 22 and 24 are pivoted about support shafts 22$a$ and 24$a$ resting on the main chassis 1 and biased in the direction of the arrow F under the influence of springs 58 and 67 lying on the main chassis 1. The arms 22 and 24 also have at it one end engaging projections 22$b$ and 24$b$ with two bearing surfaces 22$c$ and 22$d$ and 24$c$ and 24$d$.

The arms 22 and 24 are biased in the direction of the arrow E by the springs 57 and 66 so as to offset the forces of the springs 58 and 67 via pins 18$c$ and 20$c$ on the actuator rods 18 and 20 in a stop mode and play mode. However, if the actuator rods 18 and 20 are moved in the direction of the arrow A upon actuation of the stop levers 6 and 11 or the auto-stop mechanism as mentioned previously, then the arms 22 and 24 rotate in the direction of the arrow F by the springs 58 and 57. The span of the rotating movement of the arms in the direction of the arrow E under the influence of the springs 57 and 66 is limited by pins 22$e$ and 24$e$ standing from the main chassis 1.

Cam gears 25 and 28 are pivoted about support shafts 25$a$ and 28$a$ on the main chassis 1. The cam gears 25 and 28 each consist of a geared portion on its periphery and a gear-free portion 25$g$ or 28$g$ and the top surface thereof bears a first hump 25$f$ or 28$f$ which brings the projections 22$b$ and 24$b$ on the arms 22 and 24 into engagement with the gear-free portion 25$g$ and 28$g$. Cams 25$b$ and 28$b$ of a circular shaped strip with a gradually varying radius of curvature about the support shafts 25$a$ and 28$a$ are mounted on the top surfaces of the cam gears 25 and 28. Formed on the fringe of the cams 25$b$ and 28$b$ are outwardly extending second humps 25$e$ and 28$e$ in a position to correspond to the gear-free portions 25$g$ and 28$g$ and upwardly extending third humps 25$d$ and 28$d$ in a position opposite the above mentioned position.

The projections 21$d$ and 23$d$ of the subchassis-actuating arms 21 and 23 move slidingly on cam inner surfaces 25$c$ and 28$c$ of the cams 25$b$ and 28$b$. In any mode other than play mode maximum diameter portions 25$c_2$ and 28$c_2$ are seated on the sliding projection 21$d$ and 23$d$ and the subchassis-actuating arms 21 and 23 are held in contact with the pins 21$c$ and 23$c$ under the influence of the springs 51 and 75. On the other hand, in play mode of record mode minimum diameter portions 25$c_1$ and 28$c_1$ move slidingly over the projections 21$d$ and 23$d$ and the subchassisactuating arms 21 and 23 are rotated in the direction of the arrow E against the springs 51 and 75 and forced into its operating position in which subchassises 35 and 39 are moved back to its operating position for record mode or play mode. There are formed incline portions 25$c_3$ and 28$c_3$ intermediate the minimum diameter portions and the maximum diameter portions.

Driving gears 26 and 29 are pivoted on support shafts 26$a$ and 28$a$ on the main chassis 1 together with pulleys 26$b$ and 29$b$ which are driven by driving motors 27 and 30 through conveyer belts 77 and 78 extending between the pulleys 26$b$ and 29$b$ and motor shafts 27$a$ and 30$a$. Having engaged with the gear portions of the cam gears 25 and 28, the cam gears 25 and 28 are driven. That is, the cam gears and power-assisted with the driving motors in placing the tape recorder into a desired one of the operating modes. In stop mode the gear-free portions 25$g$ and 28$g$ of the cam gears 12 and faced vis-a-vis to the driving gears 26 and 29 with a given space due to engagement between the projections 17$d$ and 19$d$ of the trigger arms 17 and 19.

The subchassises 35 and 39 are held in the directions of the arrows A and B on the main chassis 1 by fitting guide shafts 35$a$ and 39$a$ extending from the main chassis 1 into guide holes 35$b$ and 39$b$ formed therein. Erase heads 40 and 42 and record/play heads 41 and 42 are fixedly secured on the subchassises and the record switch sensing levers 34 and 38 are pivoted about support shafts 34$a$ and 38$a$ and biased in the direction of the arrow E under the force of springs 47 and 64 lying against the record switch sensing levers. With such an arrangement, the pins 34$b$ and 38$b$ on the forward ends of the record switch sensing levers 34 and 38 are in engaging relation with the bearing surfaces 4$c$ and 9$c$ of the record levers 4 and 9.

It is understood that the subchassises 35 and 39 are urged constantly toward the direction of the arrow B by the force of springs 49 and 63 lying on the main chassis 1. The subchassises are in either of two positions: the first position in which the two heads 40 and 41 and 42 and 43 are spaced away from the tape in a cassette (not shown); and the second position (in record mode or play mode) in which the subchassis-actuating arms 21 and 23 slide in the direction of the arrow A and the two heads are held completely in contact with the tape.

Start springs 50 and 65 are wound about support shafts 50$a$ and 65$a$ extending from the main chassis 1 with its one end engaging with pins 50$b$ and 65$b$ on the main chassis 1 and its remaining end being engageable and removable from the third humps 25$d$ and 28$d$ of the cam gears 25 and 28 and giving the cam gear 25 and 28 torque of rotation in the direction of the arrow E when engaging with the humps.

When engaging with the third humps 25d and 28d, the start springs 50 and 65 are compressed and held under energy-storing state. Should the projections 17d and 19d on the trigger arms 7 and 19 be disengaged from the third humps 25d and 28d of the cam gears 25 and 28, the springs 50 and 65 permit the cam gears 25 and 28 to rotate in the direction of the arrow E.

Pins 50c and 65c, when the start springs 50 and 65 are disengaged from the third humps 25d and 28d, prevent the start springs 50 and 65 from expanding too much. It is noted that, after the projections 17d and 19d on the trigger arms 17 and 19 are disengaged and the cam gears 25 and 28 are rotated in the direction of the arrow E, the cam gears 25 and 28 come in mesh with the driving gears 26 and 29 and continue further rotating.

Record switch levers 31 and 36 are held slidable in the directions of the arrows A and B by fitting its guide holes 31b and 36b about guide shafts 31a and 36a on the main chassis 1 and are constantly biased in the direction of the arrow B under the infuence of springs 48 and 62 lying on the main chassis 1. Stepped portions 31d and 36d on one side of the record switch levers 31 and 36 are engageable and removable from the stepped portions 34c and 38c of the record switch sensing levers 34 and 38.

Link levers 32 and 37 are pivoted about support shafts 32a and 37a on the main chassis 1 with its pins 32c and 37c on its one end engageable with the end surfaces 31c and 36c of the record switch levers 31 and 36 and pins 32b and 37b at the remaining ends engageable with the bearing surfaces 33c and 33e of the record switch levers 33.

The record switch lever 33 is held slidable in the directions of the arrows C and D by fitting its guide hole 33b about a guide stud 33a on the main chassis 1 and constantly biased in the direction of the arrow C under the infuence of a spring 46 resting on the main chassis 1.

A head switch lever 44 on the main chassis 1 is switchable by engaging to or disengaging from the backward end of the record switch lever 31 and electrically connected to the record/play heads 41 and 43 of the first and second recording/playing mechanisms (I) and (II) and a recording circuit REC together with a record switch 45 which is switchable ON and OFF depending upon whether it engages with the bearing surface 33d of the record switch lever 33. The head selection switch 44 operates to select the head 43 of the second recording/playing mechanism (II) unless the record switch lever 31 is urged.

An operation selection switch 72 is switched ON and OFF depending upon whether it engages with the bearing surface 2g of the switch lever 2. A power switch 73 is mounted on the main chassis 1 and so interlocked with the shift lever 14 that it is switched ON and OFF depending upon engagement or non-engagement with the bearing surface 14c of the shift lever 14.

Figure 6:
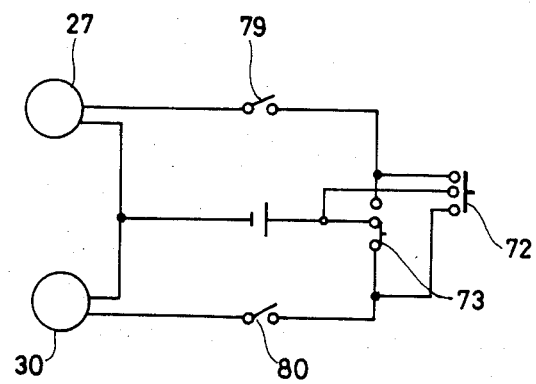
FIG. 6 is an electrical wiring of a driving motor.

These two switches are electrically connected to the driving motors 27 and 30, a capacitor C, main power switches 79 and 80, etc., as indicated in FIG. 6. The main power switches 79 and 80 open and close directly a path to the driving motors 27 and 30 in the first and second recording/playing mechanisms (I) and (II) in response to its respective button levers in the mechanisms (I) and (II).

The tape recorder as described in detail above will operate as follows.

(1) Stop Mode (see FIG. 1)

In this mode, the button-coupled levers for the first and second recording/playing mechanisms (I) and (II) are placed in its non-operating position and the subchassises 35 and 39 are seated in stop position. The gear-free portions 25g and 28g of the cam gears 25 and 28 stand in a position facing against the driving gears 26 and 29.

The stop mode as depicted in FIG. 1 is the state where the shift lever 8 has been urged in the direction of the arrow B upon operation of the autostop assembly responsive to discontinued driving in the first recording/playing mechanism (I) and the power switch 73 is in the position for selection of the driving motor 30 in the second recording/playing mechanism (II) as seen from FIG. 6. Since the notch 2a of the switch lever 2 receives the hook 3b of the positioning lever 3, the operation selection switch 72 is in the OFF position (first position).

Figure 2:
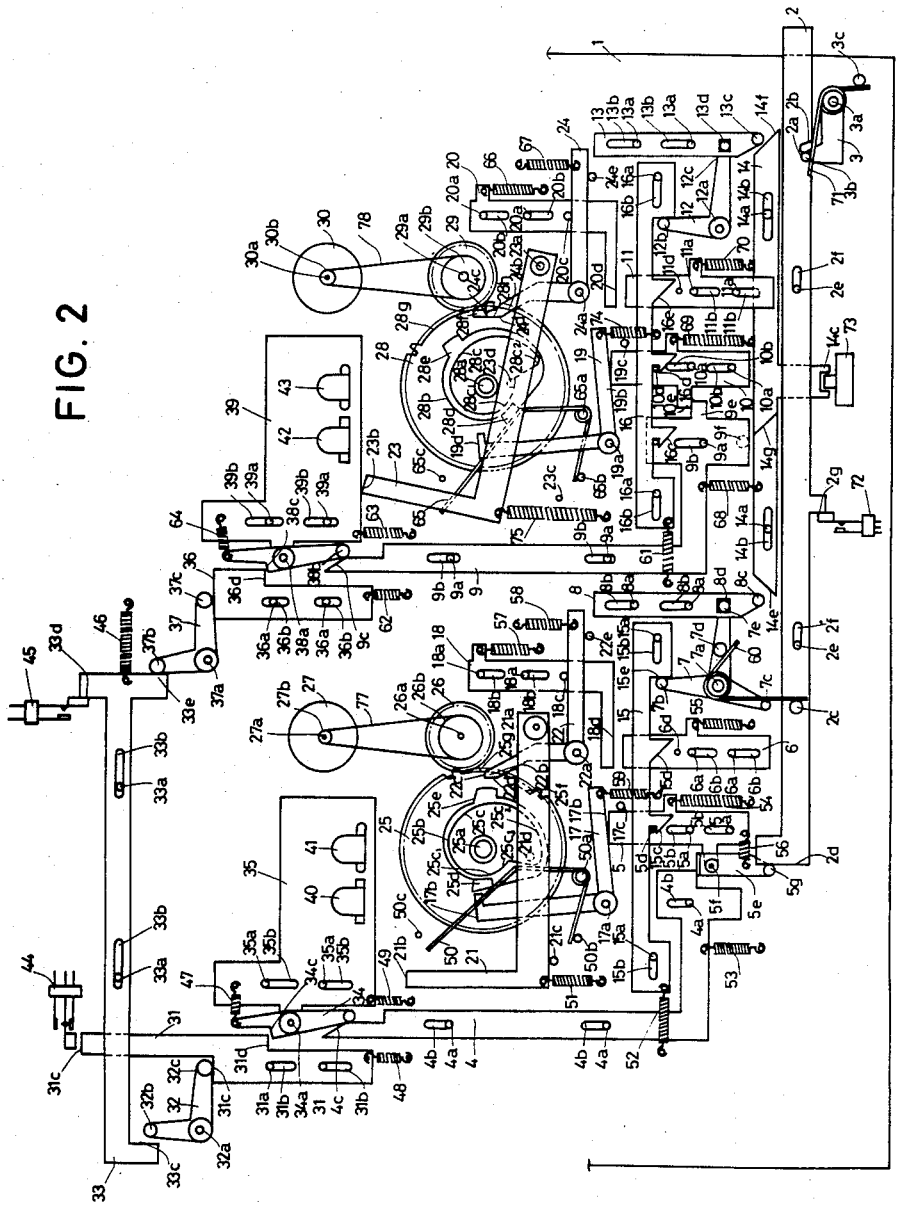
FIGS. 2 and 3 are views for explaining continued record mode.
Figure 3:
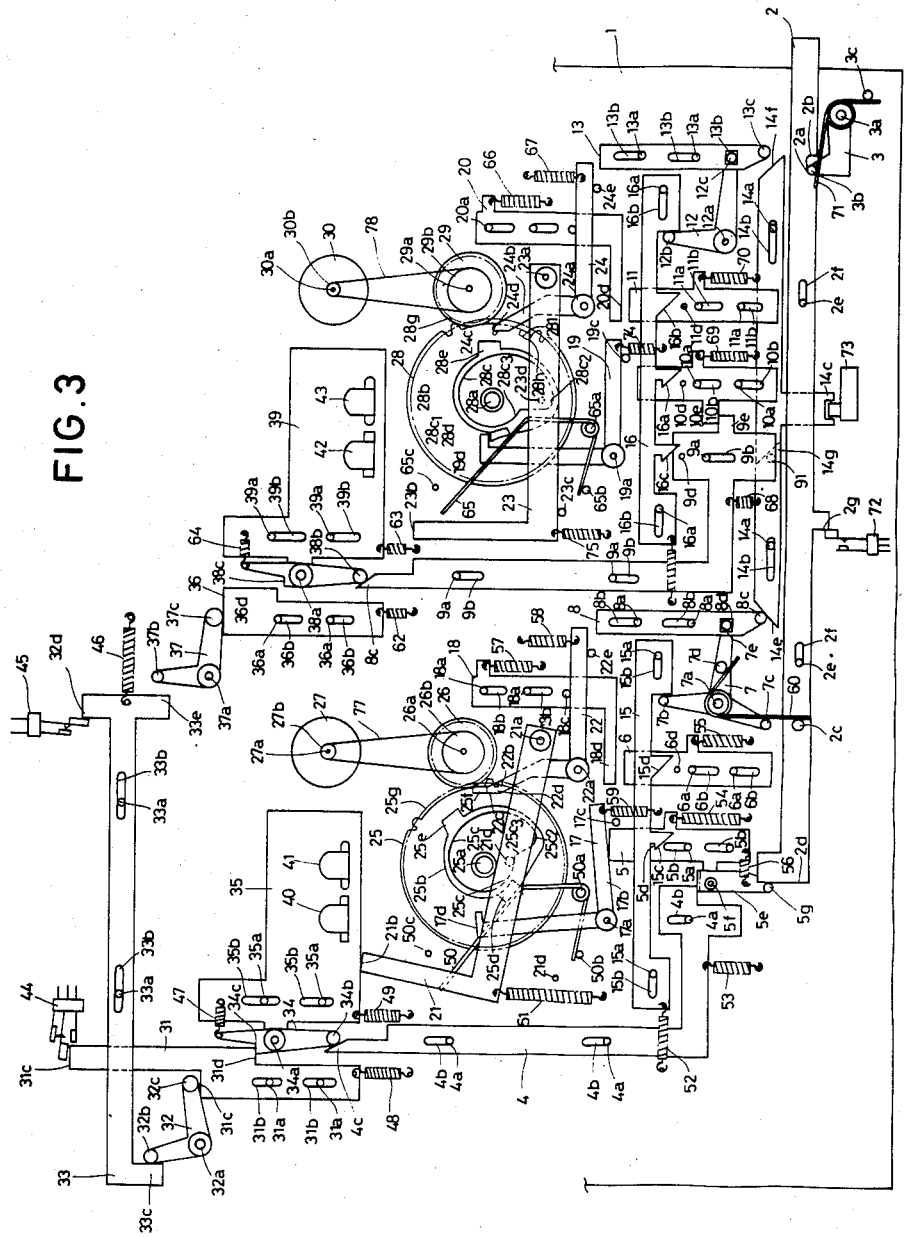

(2) Mode Change from Stop Mode to Continued Record Mode (see FIGS. 2 and 3)

The tape record is placed from the above mentioned stop mode into continued record mode using the first and second recording/playing mechanisms in the following manner. In the stop mode of FIG. 1, that is, the stop mode where the notch 2a of the switch lever 2 is in engaging relation with the positioning lever 3 (this stop mode is referred to as "continued record ready stop mode" pursuant to the concept of the present invention), the play lever 10 slides in the same direction as that of the record lever 9 due to engagement with the projections 9e and 10e when the record lever 9 in the second recording/playing mechanism (II) is pushed in the direction of the arrow A against the spring 68. Both the levers are locked in the lock portions 16c and 16b of the second lock plate 16 or into its operating position by means of the lock pins 9d and 10d.

In this instance, the shift lever 14 is pushed away in the direction of the arrow C in FIG. 1 and the third bearing surface 14g does not stand in the path where the joint 9f of the record lever 9 travels, so that the joint pin 9f may retreat in the direction of the arrow A without contacting the third bearing surface 14g even when the record lever 9 is urged in the direction of the arrow A. However, even though the third bearing surface 14g of the shift lever 14 stands in the path where the joint pin 9f travels depending upon the preceeding operating mode of the tape recorder (in other words, where the power switch 73 is on the motor side 27), the shift lever 14 slides in the direction of the arrow C and the third bearing surface 14g moves out of the traveling path for the joint pin 9f as soon as the joint pin 9f abuts on the inclined portion of the third bearing surface 14g. Therefore, nothing happens which disturbs operation trigged by the record lever 9 depressed. Under these circumstances, the shift lever 14 slides in the direction of the arrow C, turning the power switch 73 to the driving motor side 30. The motor 30 is ready to start operating as long as the power switch 80 is in ON position.

With the sliding movement of the record lever 9 and the play lever 10 in the direction of the arrow A, the record switch sensing lever 38 in engaging relation with the bearing surface 9c of the record lever 9 rotates in the direction of the arrow F against the spring 64, bringing its bearing surface 38c into position engageable with the opposing surface 36d of the record switch lever 36. The trigger arm 19, on the other hand, rotates in the direction of the arrow F against the spring 74, disengaging its projection 19d from the third hump 28d of the cam gear 28.

Upon disengagement of the humps 19d and 28d the start spring 65 previously in the energy-storing state gives the cam gear 28 the force of rotation as oriented in the direction E via the third hump 28d so that the cam gear starts rotating in the same direction and comes into mesh with the driving gear 29 already rotated by the driving motor 30 (already enabled because of the power switch 80 in ON position upon actuation of the levers 9 and 10). Therefore, the cam gear 28 continues rotating while being backed up by the force of the driving motor 30. This is a powerassisted drive scheme.

As the diameter of the cam inner surface 28c in contact with the sliding projection 23d decreases gradually with rotation of the cam gear 28, the subchassis-actuating arm 23 rotates in the direction of the arrow E against the spring 75 and the subchassis 39 retreates in the direction A gradually out of the stop position via the bearing surface 23b.

Upon the retreating movement of the subchassis 39 the record switch sensing lever 38 moves back while being shifted in the direction F by the record lever 9, so that its bearing surface 38c engages with the bearing surface 36d of the record switch lever 36 and moves the lever 36 in the same direction. Retreat of the lever 36 is transmitted into the record switch lever 33, sliding gradually the lever 33 in the direction D.

As soon as the cam gear 28 makes almost a full revolution and the gearfree portion 28g faces against the driving gear 29, or immediately before the first hump 28f comes into engagement with the projection 24b of the arm 24, the cam gear 28 is set free from the force of rotation by the driving gear 29 and the sliding projection 23d comes into contact with the minimum diameter portion $28c_1$ in the cam inner surface 28c and slides into the inclined surface $28c_3$. The result is that the cam gear 28 is given the torque of rotation oriented in the direction E via the sliding projection 23d from the spring 75 and continues rotating somehow. The cam gear 28 comes to a stop when the first hump 28f engages with the projection 24b on the arm 24.

Consequently, the subchassis-actuating arm 23 permits the subchassis 39 to slide to the most backward position so that the erase head 42 and the record/play head 43 are in position to contact the tape in a first cassette (not shown).

Under these circumstances, the tape is driven at a predetermined constant speed with a constant speed driving assembly (not shown) responsive to the play lever 10 in its operating position.

The above mentioned record switch 38, on the other hand, further retreats so that the record switch lever 33 slides in the direction of the arrow D via the levers 36 and 37 and the record switch 45 is switched ON.

The record/play head 43 is electrically connected to the recording circuit REC via the head selection switch 44 in a desired one of its selection positions. A desired program such as a song may be recorded on the tape in the first cassette. In summary, the second recording/playing mechanism (II) is first brought into record mode.

When the play lever 5 in the first recording/playing mechanism (I) is pushed toward its non-operating position in the direction A, the play lever 5 is locked into the lock portion 15c of the first lock plate 15 by means of its lock pin 5d (that is, its operating position).

As the play lever 5 slides in the direction of the arrow A, the record sensing lever 5e retreats in the direction A to move back the record lever 4 in the same direction while its projection 5g is being guided by the bearing surface 2d of the switch lever 2. Accordingly, the record switch sensing lever 34 rotates in the direction F against the spring 47, bringing its bearing surface 34c into a position to engage with the counterpart 31d of the record switch lever 31. The trigger arm 17, on the other hand, rotates in the direction F against the spring 59 and its projection 17d disengages from the third hump 25d of the cam gear 25.

Upon disengagement of the trigger arm 17 from the cam gear 25 the cam gear 25 rotates in the direction of the arrow E via the third hump 25d and comes into mesh with the driving gear 26 by the action of the start spring 50 in the energy-storing state.

However, since the the power switch 73 is conditioned to select the driving motor 30 in the second recording/playing mechanism (II) and the driving motor 27 is supplied with no power, the motor 27 is in a disabled state and the cam gear 25 stops rotating while mating with the driving gear 26.

In conclusion, upon depression of the play lever 5 the first recording/playing mechanism (I) is placed into state which is ready to start record mode. The tape recorder changes from stop mode to continued record mode in the above manner.

In the foregoing, the instance where the record lever 9 of the second recording/playing mechanism and the play lever 5 of the first recording/playing mechanism are actuated in the named order has been fully discussed and illustrated. It is of course obvious that mode change from stop mode to continued record mode may be accomplished by switching the switch 72 OFF using the switch lever 2 and actuating the record lever 9 and the play lever 5 simultaneously or actuating the latter ahead of the former in the case where the shift lever 14 urges the power switch 73 toward the driving motor side 30 of the second recording/playing mechanism (II).

(3) Continued Record Mode

As stated previously, the player is in continued record mode. The first recording/playing mechanism (I) is ready to start continued record mode and the second recording/playing mechanism (II) is in record mode. Therefore, a program is stored on the tape in the second cassette. When recording proceeds in the second recoding/playing mechanism (II) and the tape is almost completely wound, the auto-stop assembly for the second mechanism (II) slides the full-auto lever 13 in the direction B and the actuator arm 20 in the direction of the arrow A.

The sliding movement of the full-auto lever 13 permits the second lock plate 16 to slide in the direction C via the unlock lever 12 and the record lever 9 and the play lever 10 to be unlocked from the second lock plate. The two levers 9 and 10 therefore return to its non-operating position under the influence of the springs 68 and 69 and the trigger arm 19 returns to its original position by the force of the spring 74. The projection 19d is positioned to be engageable with the third hump 23d of the cam gear 28. The full-auto lever 13, on the other hand, shifts the shift lever 14 in the direction of the arrow D with the intervention of the joint pin 13 and the second working surface 14f.

As a consequence, when the record lever 9 and the play lever 10 return to its home position, the power switch 80 is switched OFF to interrupt power supply to the driving motor 30 and the shift of the shift lever 14 forces the power switch 73 toward the driving motor side 27.

Upon the movement of the actuator arm 20 in the direction of the arrow A the arm 24 rotates in the direction of the arrow F by the spring force of the spring 67 and the projection 24 moves out of the first hump 28f of the cam gear 28 and is ready to engage with the second hump 28. In the above record mode, the cam gear 28 is given the torque of rotation from the spring 75 via the projection 23d and the subchassis-actuating arm 23 due to the fact that the sliding projection 23d is in contact with the inclined portion $28c_3$ of the cam inner surface 28c (it is obvious that the biasing force of the start spring 50 is smaller than that of the spring 75). The cam gear 28 rotates in the direction E and discontinues rotating when the second hump 25e engages with the projection 24b of the arm 24.

Because of the sliding projection 23d being positioned against the maximum diameter portion $28c_2$ of the can inner surface 28c under these circumstances, the subchassis-actuating arm 23 returns to its stop position under the influence of the spring 75 and the subchassis 39 also returns to its stop position where the tape is spaced away the heads 42 and 43. Upon the completion of the auto-stop operation of the auto-stop assembly the arm 24 together with the actuator rod 20 returns to stop position. Operation and construction of the auto-stop mechanism is fully disclosed in U.S. Pat. No. 4,190,215, for example.

As the arm 24 returns to the stop position, the projection 24b disengages from the second hump 28e and the start spring 65 exerts the force of rotation in the direction E on the cam gear 28 through the third hump 28d, so that the cam gear 28 rotates in the direction of the arrow E under the influence of the spring 65. The third hump 28d in engaging position with the projection 19d on the trigger arm 19 functions to discontinue rotation of the cam gear. Under these circumstance, the constant speed driving assembly comes into a halt and the tape does not run in response to the play lever 10 in its non-operating position.

Since the record switch lever 36 returns to its home position by the force of the spring 62 as the subchassis 39 returns to its home position, the record switch lever 33 is released from the pressure of the link lever 37 and returns to its home position by the force of the spring 46, thus placing the record switch 45 into OFF position. Therefore, only the second recording/playing mechanism (II) is brought into stop mode.

Operation of the full-auto lever 13 shifts the shift lever 14 in the direction of the arrow D and the motor 27 is driven to rotate the driving gear 26, based upon the fact that the power switch 73 has been switched to the driving motor side 27.

The cam gear 25 waiting in mesh with the driving gear 26 starts rotating at once and brings the subchassis 35 into its operating position with the help of the subchassis-actuating arm 21 as with the cam gear in the second recording/playing mechanism (II) and transmits the sliding movement of the subchassis 35 into the record switch lever 31 via the record switch sensing lever 34 and then into record switch lever 33 via the link lever 33 until it makes substantially a complete revolution and discontinues rotating upon engagement between the third hump 25f and the projection 22b on the arm 22. The movement of the lever in the direction D turns ON the record switch 45. In response to the backward movement of the lever 31 in the direction A the head selection switch 44 enables the record/play head 41 in the first recording/playing mechanism (I) to be connected to the recording circuit REC.

In the above manner, the first recording/playing mechanism (I) and then the second (II) are automatically placed into record mode. Due to operation of the constant-driving assembly a program such as a musical song is recorded on the tape in the first cassette through the use of the head 41.

Figure 4:
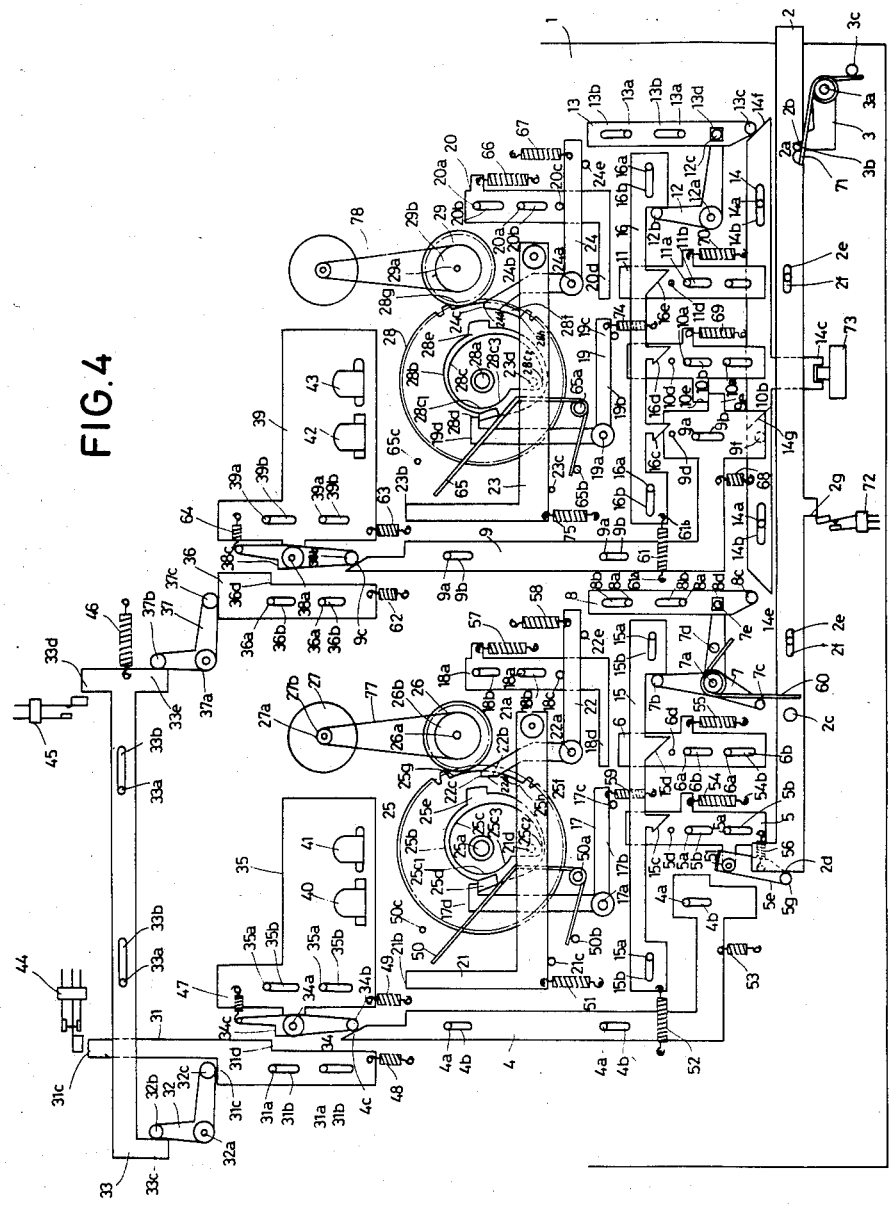
Figure 5:
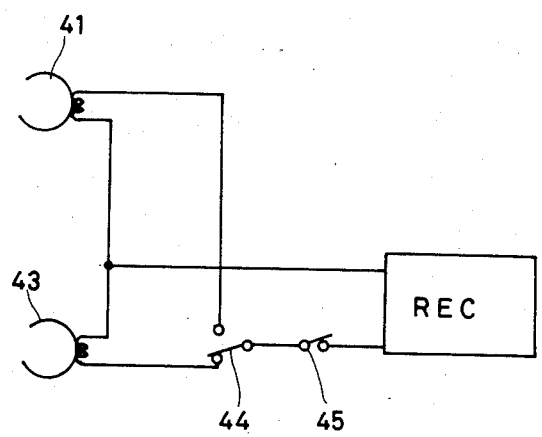
FIG. 5 is an electric wiring of a recording circuit.

(4) Mode Change from Continued Record Mode to Stop Mode (see FIG. 4)

As recording proceeds on the second recording/playing mechanism (II) and then the first (I) is continued record mode at the end of the tape in the first cassette, the auto-stop assembly for the first mechanism (I) becomes operable so that the full-auto lever 8 slides in the direction of the arrow B and the actuator rod 18 slides in the direction A.

In response to the sliding movement of the full-auto lever 8 the shift lever 14 is urged against the joint pin 8c on the lever 8 by the first working surface 14e and shifted in the direction C, turning the power switch 73 toward the driving motor side 30. When the first lock plate 15 is urged by the unlock lever 7 rotatable upon the sliding movement of the full-auto lever 8, the shift lever 14 moves in the direction C to unlock the play lever 5. When the operation switch lever 2 is given the force of rotation of the unlock lever 7 via the spring 60, the lever 2 slides in the direction D into the second position so as to offset the force of the spring 71. Furthermore, the lever 2 engages with the positioning lever 3 by means of its notch 2b, thus turning OFF the operation switch 72.

When being unlocked, the play lever 5 returns to its non-operating position under the force of the spring 54. The actuator rod 18 moves in the direction of the arrow A and the arm 22 rotates in the direction F so that the projection 22b disengages from the third hump 25f of the cam gear 25. The cam gear 25 traces the same procedure as does the cam gear 28 in changing from record mode to stop mode, so that the subchassis 35 returns to its stop position.

In response to the returning movement of the subchassis 35 the springs 46 and 48 return the record switch levers 31 and 33 to its home position, turning the head selection switch 44 toward the record/play head 43 and turning OFF the record switch 45.

The record lever 4 also returns to its non-operating or home position under the force of the spring 53. With the switch lever 2 moving in the first position, the record sensing lever 5e rotates in the direction of the arrow E against the spring 56 and moves out engagement with the bearing surface 4d of the record lever 4.

The tape recorder is changed into stop mode as seen from FIG. 4. This stop mode is different from the continued record ready stop mode of FIG. 1 in that the two motors 27 and 30 are supplied with power simultaneously and continued record mode is impossible when the record lever 9 and the play lever 5 are actuated simultaneously or sequentially as in the case of change from the continued record ready stop mode to the continued record mode, because of the operation selection switch 72 being in ON position with the switch lever 2 in the first position.

However, since the switch 72 in ON position in the stop mode of FIG. 4, the first and second recording/playing mechanisms (I) and (II) may be actuated independly on each other upon actuation of the respective ones of the associated button levers. For example, when the play lever 5 in the first recording/playing mechanism (I) is depressed to lock the first lock plate 15, the cam gear makes substantially a full revolution and brings the subchassis 35 into its operating position with the help of the subchassis-actuating arm 21 and the tape recorder itself is brought into play mode.

In this case, since the record sensing lever 5e is shifted against the spring 56 by the operation selection lever 2, the record lever 4 does not work nor does the recording circuit REC work.

In the case where the record lever 9 is actuated and the play lever 10 is actuated and locked at the second lock plate 16 within the second recording/playing mechanism (II) at the same time, the cam gear 28 makes substantially a complete rotation and brings the subchassis 39 into its operating position through the use of the subchassis-actuating arm 23. The subchassis 39 places the record switch 45 into ON position by way of the record lever 9, the record switch lever 36, the link lever 37 and the record switch lever 33, thus the player is brought into record mode. In the mechanism (II), when only the play lever 10 is depressed and the lever 10 is locked at the second lock plate 16, the cam gear 28 makes substantially a complete rotation and the subchassis 39 is brought into its operating position via the actuator arm 23. Therefore, the player stands in play mode.

Provided that the two mechanisms (I) and (II) are driven with the former in play mode and the latter in record mode, the program being played back in the machanism (I) may be duplicated on the tape in the mechanism (II).

Although the foregoing has discussed the continued record mode in full detail, it is obvious that the present invention is equally applicable to continued play mode. In the latter case, the switch lever 2 bears three selectable positions, that is, addition of a third position where the switch lever 72 is turned OFF and the record sensing lever 5e is conditioned against the spring 56 not to contact the record lever 4. Further, a pin is additionally provided on the bottom of the play lever 10 and an inclined surface is provided which helps the joint pin push the shift lever 14 in the direction C. With such an arrangement, play mode may be take over from the mechanism (I) to the mechanism (II).

The invention being thus described, it will be obvious that the same may be varied in many ways. Such variations are not to be regarded as a departure from the spirit and scope of the invention, and all such modifications are intended to be included within the scope of the following claims.

What is claimed is:

1. A tape recorder comprising:

first and second recording/playing mechanisms for driving a tape at a constant speed for recording or playing;

an auto-stop assembly for discontinuing operation of said first or second recording/playing mechanism when an end of the tape approaches;

a control assembly for placing said first or second recording/playing assemblies selectively into a first stop mode or a second stop mode, said first stop mode being the mode from which said first or second recording/playing mechanisms is adapted to be switched into a constant driving mode independently of each other and said second stop mode being the mode from which the constant driving mode is adapted to be switched from said first recording/playing mechanism to said second or vice versa;

a link assembly connected between said auto-stop assembly and said control assembly for rendering said control assembly operable to shift the constant driving mode from said first recording/playing mechanism to said second or vice versa upon the completion of the constant driving mode in said second or first recording/playing mechanism;

a first driving motor and a second driving motor operatively connected to said first and second recording/playing mechanisms, respectively, each driving motor is provided for execution of the constant driving mode and each of the driving motors is adapted to assist the control assembly for bringing the associated recording/playing mechanism into a desired operating mode;

means for sensing the completion of the constant driving mode of said first recording/playing mechanism as the end of the tape approaches, and for enabling the motor for said second recording/driving mechanism in response to said auto-stop assembly responsive to the completion of the constant driving mode in said first recording/playing mechanism and wherein the constant driving mode is taken over from said first recording/ playing mechanism automatically; and means for sensing the completion of the constant driving mode of said second recording/playing mechanism as the end of the tape approaches, and for enabling the motor for said first recording driving mechanism in response to said auto-stop assembly responsive to the completion of the constant driving mode in said second recording/playing mechanism and wherein the constant driving mode is taken over from said second recording/playing mechanism automatically;

said control assembly includes a first cam gear and first cam operatively connected to said first driving motor and a second cam gear and second cam operatively connected to said second driving motor, said first and second cam gears and first and second cams being operatively connected to said link assembly for assisting in the shifting of the constant driving mode from said first recording/playing mechanism to said second or vice versa.

2. A tape recorder according to claim 1, and further including a first start spring operatively connected to said first cam and a second start spring operatively connected to said second cam, said first and second start springs initiating rotation of said first and second cams, respectively.

3. A tape recorder according to claim 1, wherein said link assembly further includes a first locking plate and a second locking plate in operative cooperation with a first play lever and a second play lever, respectively, for selectively locking said first and second play levers and said first and second recording/playing mechanism in a non-operative position.

4. A tape recorder according to claim 3, and further including a first unlock lever and a second unlock lever operatively connected to said first and second locking plates, respectively, for selectively unlocking said first and second locking plates.

5. A tape recorder according to claim 3, and further including a first trigger arm and a second trigger arm operatively connected to said first and second play levers and said first and second cams, respectively, for selectively retaining said first and second cams in a predetermined position.

6. A tape recorder as set forth in claim 1 further comprising means for placing either said first or second recording/playing mechanisms into said first stop mode upon the completion of a continued execution of the constant driving mode from either said first recording/playing mechanism or said second recording/playing mechanism.

7. A tape recorder as set forth in claim 1 further comprising a head selection switch for determining whether said continued constant driving mode should be taken over from said one of the mechanisms to said remaining mechanism and said link assembly being responsive to the position of said head selection switch.

* * * * *